United States Patent
Mori et al.

(10) Patent No.: US 7,220,064 B2
(45) Date of Patent: May 22, 2007

(54) COUPLING OPTICAL SYSTEM FOR OPTICAL COMMUNICATIONS

(75) Inventors: Masao Mori, Saitama (JP); Yu Kitahara, Saitama (JP); Makoto Oomura, Ina Machi (JP); Yoko Yamamoto, Fuchu (JP); Toshiaki Katsuma, Tokyo (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/429,988

(22) Filed: May 9, 2006

(65) Prior Publication Data

US 2006/0262427 A1    Nov. 23, 2006

(30) Foreign Application Priority Data

May 12, 2005    (JP)    ............... 2005-139722

(51) Int. Cl.
| | |
|---|---|
| G02B 6/36 | (2006.01) |
| G02B 6/42 | (2006.01) |
| G02B 6/32 | (2006.01) |
| G02B 6/26 | (2006.01) |
| G02B 6/38 | (2006.01) |
| G02B 6/02 | (2006.01) |
| G02B 6/032 | (2006.01) |
| G02B 3/00 | (2006.01) |
| G02B 9/00 | (2006.01) |
| G02B 21/02 | (2006.01) |
| G02B 1/06 | (2006.01) |
| G02B 3/12 | (2006.01) |
| G02B 3/10 | (2006.01) |

(52) U.S. Cl. ............................ 385/88; 385/31; 385/33; 385/40; 385/50; 385/55; 385/74; 385/93; 385/125; 359/362; 359/642; 359/655; 359/656; 359/721

(58) Field of Classification Search ............... 385/31, 385/33, 40, 50, 55, 74, 88, 93, 125; 359/362, 359/642, 655, 656, 665, 721
See application file for complete search history.

(56) References Cited

U.S. PATENT DOCUMENTS

2006/0050412 A1*    3/2006    Ito et al. ............... 359/745

FOREIGN PATENT DOCUMENTS

JP    9-61665    3/1997

* cited by examiner

*Primary Examiner*—Brian Healy
*Assistant Examiner*—Jerry Martin Blevins
(74) *Attorney, Agent, or Firm*—Arnold International; Jon W. Henry; Bruce Y. Arnold

(57) ABSTRACT

A coupling optical system for coupling light into an optical fiber of an optical communications system includes a liquid that includes a dispersion of microscopic particles and two transparent media that hold the liquid between them along an optical axis. The refractive power of the liquid is variable according to the electromagnetic field applied to the liquid to vary the migration of the microscopic particles of the dispersion within the liquid. The position of a light collecting point of the coupling optical system is adjustable based on the variation in the refractive power of the liquid so that light can be efficiently coupled into optical fibers at different distances along the optical axis from the coupling optical system. At the light collecting point, the end surface of an optical fiber collects light from a light source or another optical fiber. One or more collimator lenses may help converge the light.

3 Claims, 2 Drawing Sheets

COUPLING OPTICAL SYSTEM FOR OPTICAL COMMUNICATIONS

FIELD OF THE INVENTION

The present invention relates to a coupling optical system for optical communications that can efficiently converge light on the end of an optical fiber axis even with variations in environmental and operating conditions.

BACKGROUND OF THE INVENTION

An optical communications system that uses optical fibers requires a coupling optical system that converges transmitted light that diverges from a light source or the optical output end surface of an optical fiber and enters one side of the coupling optical system so that the transmitted light is concentrated and collected to efficiently enter the light incident end surface of an optical fiber.

Conventional coupling optical systems used in optical communications that include a ball lens (spherical lens) have been commonly known. An advantage of using a ball lens is that installation is easy because alignment is unnecessary. However, there is a disadvantage in that transmitted light is difficult to efficiently concentrate on the light incident end surface of the optical fiber that is receiving the light due to a large spherical aberration. Consequently, there is a problem in coupling optical systems that use a ball lens in that enhancing the coupling efficiency is difficult.

Coupling optical systems for optical communications that use an aspheric lens have also been proposed, for example, in Japanese Laid-Open Patent Application H09-61665. Light transmitted by the coupling optical system can be collected on the light incident end surface of the optical fiber by suppressing the spherical aberration by using an aspheric lens. Thus the coupling efficiency can be improved in comparison to using a ball lens.

However, a coupling optical system for optical communications that uses an aspheric lens has a problem of large deterioration in the coupling efficiency when environmental conditions or operating conditions of the system change due to the position of the light collection point of the transmitted light moving significantly in the optical axial direction. For example, significant movement may occur when the wavelength of light incident on the coupling optical system is different from the design wavelength due to a change in the system, or when the wavelength of the light incident on the coupling optical system fluctuates due to temperature changes in the working environment that may occur, for example, when using a semiconductor laser as the light source. Further, an aspheric lens made of common plastic has a higher chance of reducing the coupling efficiency because the refractive power varies a lot due to temperature changes in the working environment.

Applicants of the present application have previously described, for example, in Japanese Patent Application 2005-67009, an optical element having variable refractive power formed of a liquid that includes a dispersion of microscopic particles between two transparent media. This variable refractive power element is expected to be used in various optical systems because the refractive power of the optical element, as well as the reciprocal of the refractive power (i.e., the focal length of the optical element), is variable according to the switching of an electromagnetic field applied to the liquid that varies the migration of the microscopic particles of the dispersion within the liquid.

BRIEF SUMMARY OF THE INVENTION

The present invention relates to a coupling optical system for optical communications that can maintain a high coupling efficiency even when environmental conditions, operating conditions, and other conditions that might affect the coupling efficiency vary.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
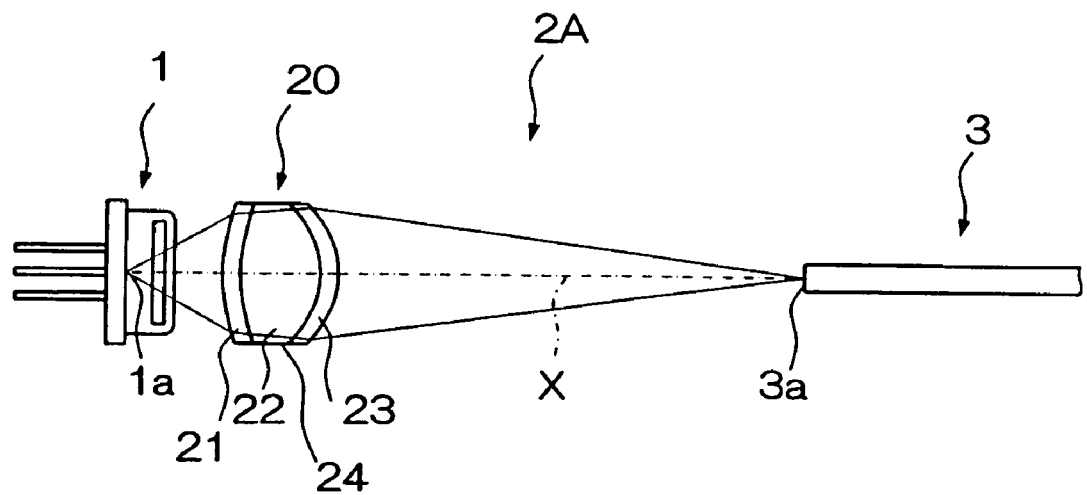
FIG. 1 shows a cross-sectional view of the coupling optical system for optical communications of Embodiment 1 of the present invention.

In the present invention, the position of the light collecting point of light transmitted is adjustable based on the variation in the refractive power of a liquid that includes a dispersion of microscopic particles according to the electromagnetic field applied to the liquid.

More specifically, a coupling optical system for optical communications that relates to the present invention is a coupling optical system for optical communications that transmits and outputs light from the optical communications unit of the optical communications system by collecting light incident on the end surface of an optical fiber. The coupling optical system includes an optical element that is formed of a liquid that includes a dispersion of microscopic particles. The liquid is held between two transparent media in the optical axis direction so that the refractive power of the liquid with dispersed particles therein can be varied according to an applied electromagnetic field. The position of the light collecting point of the transmitted light varies according to the variation in the refractive index of the liquid with microscopic particles dispersed therein.

The coupling optical system for optical communications that relates to the present invention is preferably arranged between a light source that outputs the light to be transmitted and the incident end surface of an optical fiber or arranged between the light output end surface of one optical fiber and the light incident end surface of another optical fiber.

In addition, the term "light collecting point" as used above means the position where transmitted light is converged by the coupling optical system for optical communications of the present invention so that the quantity of light transmitted by the optical fiber receiving the converged light is maximized when the end surface of the optical fiber is placed at this position of convergence.

The following advantageous effects may be achieved according to the coupling optical system for optical communications that relates to the present invention by providing for adjustment of the position of the light collecting point of transmitted light by changing the refractive power of a liquid that includes a dispersion of microscopic particles by varying the electromagnetic field applied to the liquid so as to affect the dispersion.

More specifically, when environmental conditions and operating conditions vary in the optical communications system, for instance, when the wavelength of transmitted light differs from the design wavelength due to changes in the system, or the wavelength of transmitted light fluctuates due to temperature changes of the working environment when using a semiconductor laser as the light source, transmitted light can be collected on the light incident end surface of the optical fiber by adjusting the position of the light collecting point of the transmitted light in order to make it possible to maintain high coupling efficiency.

Additionally, the coupling optical system for optical communications that relates to the present invention is more suited to be equipped within an optical coupler system occupying a relatively small space in an optical communications system in comparison with, for instance, an optical coupler system where a lens movement mechanism is provided in order to have the ability to adjust the position of the light collecting point of transmitted light. This is because the coupling optical system for optical communications that relates to the present invention is simpler and more easily made smaller.

Embodiments 1–4 of the present invention will now be individually described with reference to the drawings.

Embodiment 1

Figure 2:
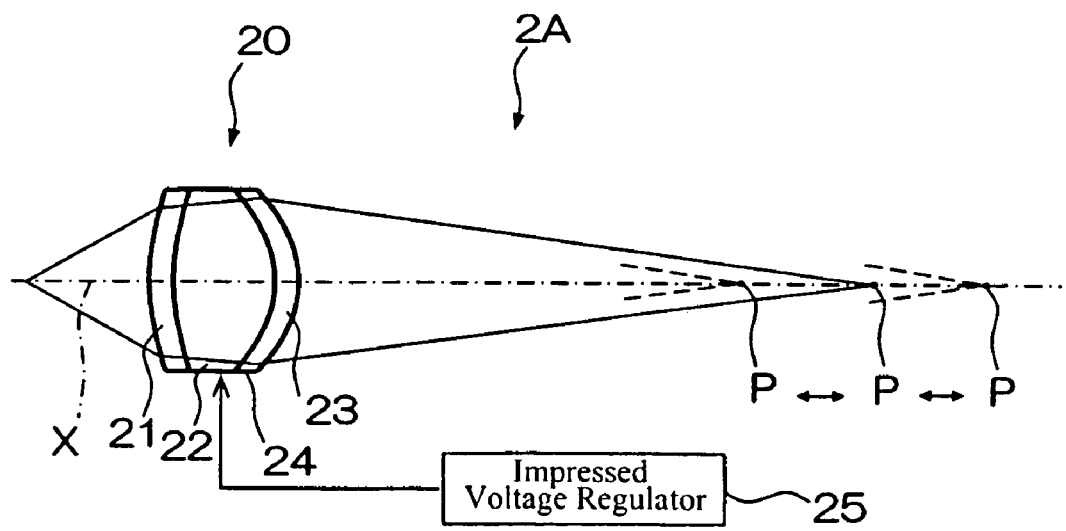
FIG. 2 shows a cross-sectional view of the optical element with variable refractive power of FIG. 1.

FIG. 1 shows a cross-sectional view of the coupling optical system for optical communications of Embodiment 1 of the present invention, and FIG. 2 shows a cross-sectional view of the optical element with variable refractive power of FIG. 1.

As shown in FIG. 1, a coupling optical system 2A for optical communications is arranged between a light source 1, such as a semiconductor laser (LD), a light emitting diode (LED), or a similar light emitting device, and an optical fiber 3. The arrangement is such that light exiting an optical output point 1a of the light source 1 on the optical axis X is collected on the light incident end surface 3a of an optical fiber 3, and the light is converged by the variable refractive power optical element 20, as shown in FIG. 1.

As shown in FIG. 2, the variable refractive power optical element 20 includes a liquid 22 that contains a dispersion of microscopic particles and the liquid is arranged along the optical axis X between two transparent media 21 and 23. In particular, the liquid 22 with the dispersion of microscopic particles is stored in a container formed by the two transparent media 21 and 23 and a peripheral wall 24 extending around the optical axis X. The refractive power is changed by varying the migration of the microscopic particles of the dispersion of the liquid 22 by changing the electromagnetic field that affects the dispersion.

More specifically, the variable refractive power optical element 20 is subject to predetermined voltages controlled by an impressed voltage regulator 25, and the electrophoretic state of the microscopic particles in the liquid 22 is changed by changing the magnitude of the impressed voltage. When the electrophoretic state of the microscopic particles varies, the refractive index (the refractive index distribution) within the liquid 22 changes. Consequently, the refractive power in relation to the transmitted light changes and the position of the light collecting point P of the transmitted light that enters from the left side as shown in FIGS. 1 and 2 changes, as particularly shown in FIG. 2 by various locations of the light collecting point P along the optical axis X.

Additionally, in the variable refractive power optical element 20 as shown in FIG. 1, the first transparent medium 21 has a meniscus shape with its convex surface on the side nearest the light source 1, and the second transparent medium 23 has a meniscus shape with its convex surface on the side nearest the optical fiber 3. The surfaces of the second transparent medium 23 have greater curvatures in comparison with the curvatures of the surfaces of the first transparent medium 21, and the liquid 22 held between the two transparent mediums 21 and 23 has a biconvex lens shape, with opposed surfaces having different curvatures, and with the surface of greater curvature on the side nearest the optical fiber 3. In addition, a detailed description regarding the specific structure of the liquid in which the microscopic particles are dispersed, as well as the microscopic particles of the dispersion, is omitted herein as these details are disclosed in US 2006/0050412 A1 published Mar. 9, 2006, which published patent application is herein incorporated by reference (specifically, see paragraphs [0113]-[0117], [0125]-[0127], and [0215]-[0227] thereof).

The coupling optical system 2A for optical communications shown in FIG. 1 is set so as to efficiently converge transmitted light that exits from the optical output point 1a of the light source 1 on the light incident end surface 3a of the optical fiber 3. However, the coupling efficiency deteriorates as the position of the light collecting point changes according to the wavelength change when the wavelength of the transmitted light differs from the design wavelength due to changes in the optical communications system or due to the wavelength of the transmitted light fluctuating due to temperature changes in the working environment.

However, according to the coupling optical system 2A for optical communications, the position of the light collecting point of transmitted light is adjustable by varying the refractive power for the light transmitted by the variable refractive power optical element 20 as described above, so that the transmitted light can be collected efficiently on the light incident end surface 3a of the optical fiber 3 and a high coupling efficiency can be maintained by adjusting the position of the light collecting point of transmitted light when the wavelength of the transmitted light changes.

In addition, the position of the light collecting point is preferably adjusted so as to match with the position of the light incident end surface 3a of the optical fiber 3 with the refractive power adjustment of the variable refractive power optical element 20 being made continuously so that the position of the light collecting point of the transmitted light can be varied continuously. On the other hand, when the refractive power adjustment of the variable refractive power optical element 20 is changed in phases and the position of the light collecting point of the transmitted light can be changed only discretely, the position where the quantity of transmitted light can be at its maximum after transmission through the optical fiber 3 may be changed by discrete variations in the position of the light collecting point.

Embodiment 2

Figure 3:
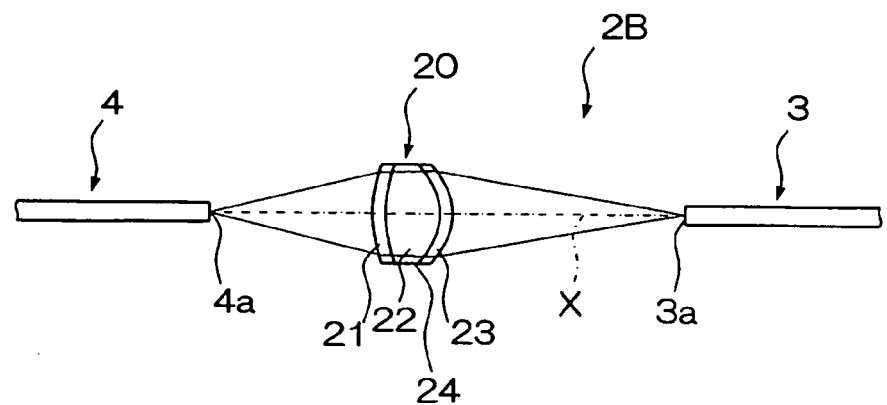
FIG. 3 shows a cross-sectional view of the coupling optical system for optical communications of Embodiment 2 of the present invention.

FIG. 3 shows a cross-sectional view of the coupling optical system for optical communications of Embodiment 2 of the present invention. In FIG. 3, the same reference symbols as in FIG. 1 are used for the elements in common with Embodiment 1, and a detailed description of these common elements is omitted below. This is also true with regard to Embodiments 3 and 4 that will be discussed after Embodiment 2 and to the drawing figures that relate specifically to Embodiments 3 and 4.

The coupling optical system 2B for optical communications shown in FIG. 3 is arranged between the light transmitting side of an optical fiber 4 and the light receiving side of an optical fiber 3. The arrangement is such that light exiting the light output end surface 4a of the optical fiber 4 is collected on the light incident end surface 3a of an optical fiber 3, and this arrangement is different from the coupling optical system 2A for optical communications shown in FIG. 1, although the variable refractive power optical element 20 operates in the same manner in both Embodiments 1 and 2.

Embodiment 3

Figure 4:
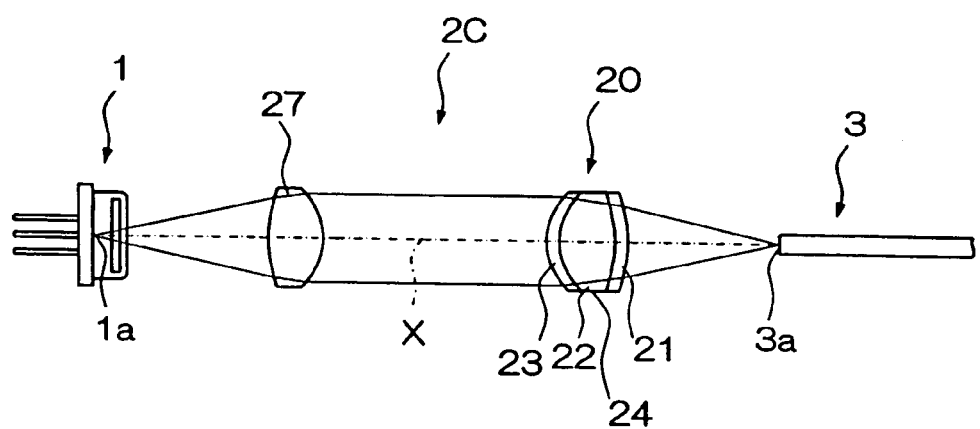
FIG. 4 shows a cross-sectional view of the coupling optical system for optical communications of Embodiment 3 of the present invention.

FIG. 4 shows a cross-sectional view of the coupling optical system for optical communications of Embodiment 3 of the present invention.

A coupling optical system 2C for optical communications shown in FIG. 4 includes a collimator lens 27 and a variable refractive power optical element 20. This arrangement is different from the coupling optical system 2A for optical communications shown in FIG. 1. Furthermore, the variable refractive power optical element 20 of FIG. 4 is shown in a reversed position along the optical axis X from that shown in FIG. 1. However, the fundamental operation of the variable refractive power optical element 20 in terms of varying the refractive power and converging the transmitted light beam from left to right as shown in both FIGS. 1 and 4 is the same.

More specifically, the coupling optical system 2C for optical communications is such that light exiting an optical output point 1a of the light source 1 on the optical axis X is collected on the light incident end surface 3a of an optical fiber 3, and the light is converged by the variable refractive power optical element 20 after being converted into a collimated light beam by the collimator lens 27. In addition, other techniques for converting the light into a collimated light beam are available, for example, light dividing structures that split the light into different light beams in order to produce a resultant collimated light beam.

Embodiment 4

Figure 5:
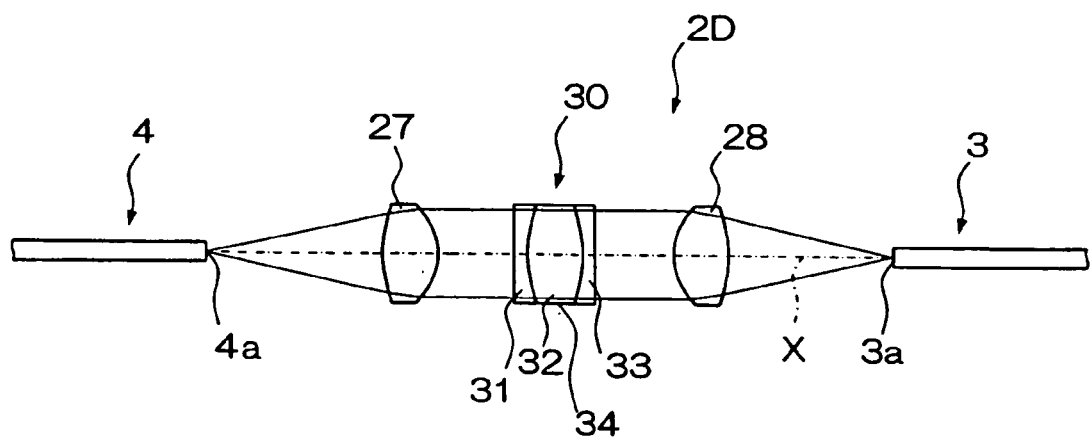
FIG. 5 shows a cross-sectional view of the coupling optical system for optical communications of Embodiment 4 of the present invention.

FIG. 5 shows a cross-sectional view of the coupling optical system for optical communications of Embodiment 4 of the present invention.

A coupling optical system 2D for optical communications shown in FIG. 5 includes a collimator lens 27, a variable refractive power optical element 30, and a converging lens 28. This arrangement is different from the coupling optical system 2B for optical communications shown in FIG. 3. Furthermore, the variable refractive power optical element 30 of FIG. 5 includes a first transparent medium 31 having a plano-concave lens shape with the concave surface on the side facing the optical fiber 3, a second transparent medium 33 having a plano-concave lens shape with the concave surface on the side facing the optical fiber 4, a peripheral wall 34, and a liquid 32 including a dispersion of microscopic particles having a biconvex lens shape that is held between the first and second transparent media 31 and 33.

These features make the arrangement of optical components of the coupling optical system 2D, as well as the shape of the liquid 32, different from that of the coupling optical system 2B shown in FIG. 3, but the fundamental operation of converging the diverging light to a light collecting point is the same.

More specifically, the coupling optical system 2D for optical communications is arranged such that light exiting the light output end surface 4a of the optical fiber 4 is collected on the light incident end surface 3a of an optical fiber 3 by the variable refractive power optical element 30 and the converging lens 28 after the light has been collimated by the collimator lens 27. Additionally, the collimator lens 27 is a biconvex lens having surfaces of different curvature, with its surface of greater curvature on the side facing the optical fiber 3, and the converging lens 28 is a biconvex lens having surfaces of different curvature with its surface of greater curvature on the side facing the optical fiber 4.

Various details of specific embodiments have been explained above. However, the present invention is not limited to the aforementioned embodiments, and thus various modifications of these embodiments are possible.

For instance, the variable refractive power optical element in each of Embodiments 1–4 above is an electrophoretic-type optical element that varies the electrophoretic state of microscopic particles in the dispersion of the liquid by varying the voltage that is applied to the liquid that includes the dispersion. However, the variable refractive power optical element may instead operate by varying the magnetic migration state of microscopic particles dispersed in the liquid by controlling a magnetic field acting on the microscopic particles, the details of which are disclosed in US 2006/0050412 A1 as discussed above.

Furthermore, the number of optical elements and the choices of optical elements, for example, the variable refractive power optical elements, lenses, diaphragms, and optical elements, and the shape of each optical element of the coupling optical system for optical communications of the present invention may be modified according to the circumstances of use.

In addition, the optical fibers used in the optical communications system applied to the present invention is irrespective of types, such as a single mode type, multi-mode type, stepped-index type, or gradient-index type. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A coupling optical system for coupling light into an optical fiber of an optical communications system along an optical axis, the coupling optical system comprising:
   a liquid that includes a dispersion of microscopic particles; and
   two transparent media;
wherein
   said liquid is held between said two transparent media along the optical axis;

the refractive power of said liquid is variable according to the electromagnetic field applied to said liquid to vary the migration of said microscopic particles of said dispersion within said liquid; and the position of a light collecting point of the coupling optical system is adjustable based on the variation in the refractive power of said liquid so that light can be efficiently coupled into optical fibers at different distances along the optical axis from the coupling optical system.

2. The coupling optical system of claim 1, wherein:

a light source emits light to the coupling optical system; and the coupling optical system converges light emitted by the light source onto an end surface of an optical fiber.

3. The coupling optical system of claim 1, wherein the coupling optical system converges light emitted from an end of one optical fiber onto an end of another optical fiber.

* * * * *